(12) United States Patent
Costello et al.

(10) Patent No.: US 6,575,439 B1
(45) Date of Patent: Jun. 10, 2003

(54) RING SHAPED SPRING DEVICE

(75) Inventors: Philip G. Costello, North Haven, CT (US); Frank R. Hrovat, Sylvania, OH (US)

(73) Assignee: Barnes Group Inc., Bristol, CT (US)

( * ) Notice: Subject to any disclaimer, the term of this patent is extended or adjusted under 35 U.S.C. 154(b) by 0 days.

(21) Appl. No.: 10/078,465

(22) Filed: Feb. 21, 2002

(51) Int. Cl.[7] .................................................. F16F 3/00
(52) U.S. Cl. ......................................... 267/89; 267/179
(58) Field of Search ........................... 267/89, 174, 91, 267/167, 170, 179

(56) References Cited

U.S. PATENT DOCUMENTS

| | | | |
|---|---|---|---|
| 1,146,933 A | | 7/1915 | Gallagher, Jr. |
| 1,290,023 A | * | 12/1918 | Clarke .......................... 267/179 |
| 1,295,316 A | * | 2/1919 | Hines .......................... 267/179 |
| 1,390,948 A | * | 9/1921 | Woodward .................. 267/179 |
| 1,943,492 A | | 1/1934 | Symington |
| 4,756,071 A | * | 7/1988 | Takeuchi ..................... 267/179 |
| 5,306,086 A | * | 4/1994 | Orlowski et al. ............. 267/89 |

* cited by examiner

Primary Examiner—Christopher P. Schwartz
Assistant Examiner—Melanie Torres
(74) Attorney, Agent, or Firm—Fay, Sharpe, Fagan, Minnich & McKee

(57) ABSTRACT

A spring device comprising a pair of spaced-apart first and second annular support plates defining a ring with a central axis; a plurality of circumferentially spaced, parallel oriented coil springs disposed between said annular plates; and, a plurality of guide assemblies located at circumferentially spaced positions around said ring, each of the guide assemblies including a first tab extending from one of the plates, a second top extending from the other of the plates to form a generally sliding contact between the first and second tabs as the plates move vertically to compress and/or release the coil springs wherein the first tab has a guide slot extending in a direction perpendicular to the plates and the second tab carries an assembled elongated guide member extending through the slot to guide vertical movement between the plates.

28 Claims, 5 Drawing Sheets

RING SHAPED SPRING DEVICE

The present invention relates to a spring device and more particularly to a spring device of the type used in automatic transmissions for motor vehicles.

INCORPORATION BY REFERENCE

Automatic transmissions for vehicles often include a plurality of coil springs that are adapted to apply a biasing force against clutch plates that control the engagement of various gears in the transmission. These coil springs are assembled in a ring shaped device comprising two annular plates having a multiplicity of circumferentially spaced, parallel compression coil springs mounted therebetween. Such a ring shaped spring device is disclosed in Orlowski 5,306,086, which is incorporated by reference herein as the basic background to which the present invention is directed.

BACKGROUND OF INVENTION

In the ring shaped spring device disclosed in Orlowski 5,306,086, there is a pair of spaced apart first and second annular support plates defining the ring shape of the spring device. A plurality of circumferentially spaced parallel oriented coil springs are disposed between the annular plates so that vertical movement of one plate toward the other compresses the springs. To interconnect the plates, an integral hook is formed in one plate and a loop is integrally formed in the other plate. The hook and loop are designed so that the device can be assembled by merely locating the various coil springs and then pressing one plate toward the other. The hook snaps over the loop to lock the plates together, with the coil springs partially compressed. However, when assembled in a transmission, the ring shaped spring device is compressed further so that the hook actually disengages the loop. Consequently, during repetitive operation of the spring assembly over many years, the individual coil springs can become canted in a manner to reduce the spring constant and cause damage and/or unintended biasing forces. By compressing the spring device for shifting the gears of the automatic transmission, distortion of the coil springs in the annular direction is magnified. Consequently, the prior ring shaped spring device, as shown in Orlowski 5,306,086 only employs the concept of integral interconnecting means and does not address the problem of controlling the annular movement of the spaced plates during long term operation of the spring device.

THE INVENTION

The present invention relates to a ring-shaped spring device as shown in Orlowski 5,306,086, wherein there are a plurality of guide assemblies located at circumferentially spaced positions around the ring. Each of these guide assemblies includes a first tab extending from one of the plates toward the other plate, a second tab extending in the opposite direction from the other plate to form a generally sliding contact between the first and second tabs as the spaced plates move vertically to compress and release the coil springs. The first tab has a guide slot with a given width. The slot extends in a direction perpendicular to the plates. The second tab carries an assembled elongated guide member extending radially through the guide slot to positively guide the vertical movement between the two plates. There is no integral interconnecting means, since the two tabs of the plates are joined together by a third member which is an assembled elongated guide member. The guide slot has an end remote from the plate from which the second tab extends. The distance of this end from the plate causes compression of the coil springs by the action of the guide member when the device is assembled. Thus, the springs are positioned between the two annular plates and the plates are oriented with the spaced tabs of one plate in sliding contact with the spaced tabs on the other plate. The springs are then compressed and the elongated guide member is press fitted through one tab and extends into the guide slot of the other tab. To support the guide member, the second tab includes a bore defined by an extruded boss that allows a press fit of the guide member in the boss to maintain the guide member in the proper horizontal position. The structure assembly procedure and operation of the present invention is different than the ring shaped spring device in Orlowski 5,306,086. These added features result in the advantage of being capable of maintaining the proper annular orientation between the spaced plates during long term operation of the spring device in an automatic transmission.

In accordance with another aspect of the present invention, there are an even number of guiding assemblies around the circumference of the matching annular plates. One group of guide assemblies has the first tab extending from the first plate and the second group has the first tab extending from the second plate. By using two groups of guide assemblies, the tabs of a plate alternate between a tab with the guide slot and a tab with the guide member. The tabs are integrally formed in the guide plates so the two plates are identical. In the preferred embodiment, four guide assemblies are used with the integral tabs at the twelve o'clock position and six o'clock position having one construction and the tabs at the three o'clock position and nine o'clock position having the opposite configuration. By merely indexing the plates 90°, identical plates can be used in constructing the ring shaped spring device.

Another aspect of the present invention involves extending tabs to locate the coil springs around the annular plates. These spring locating tabs are lanced from the edge of the plates and are bent downwardly at circumferentially spaced locations around the ring. The edge lanced tabs are bent downwardly from a position generally the midpoint of the plates, whereby the coil springs are located by the tabs in the center of the spaced plates. In this manner, a punch press operation can merely lance and bend the tabs for locating the coil springs circumferentially around the plates. The tabs are easily formed from the plates by a simple bending operation as opposed to the complex bending operation required in Orlowski 5,306,086.

The primary object of the present invention is the provision of a ring-shaped spring device having two annular plates used to capture and locate circumferentially spaced coil springs, which spring device guides the movement of the annular plates as the springs are compressed or released.

Another object of the present invention is the provision of a spring device, as defined above, which spring device uses a separate pin in a slot to control the movement of a tab on one plate with respect to a sliding tab on the other plate.

Yet a further object of the present invention is the provision of a ring-shaped spring device wherein spaced annular plates are held together by guide assemblies having members that limit the movement between the plates to a generally vertical sliding movement as the plates move vertically to compress and/or release the coil springs.

These and other objects and advantages will become apparent from the following description taken together with the accompanying drawings.

PREFERRED EMBODIMENT

Figure 1:
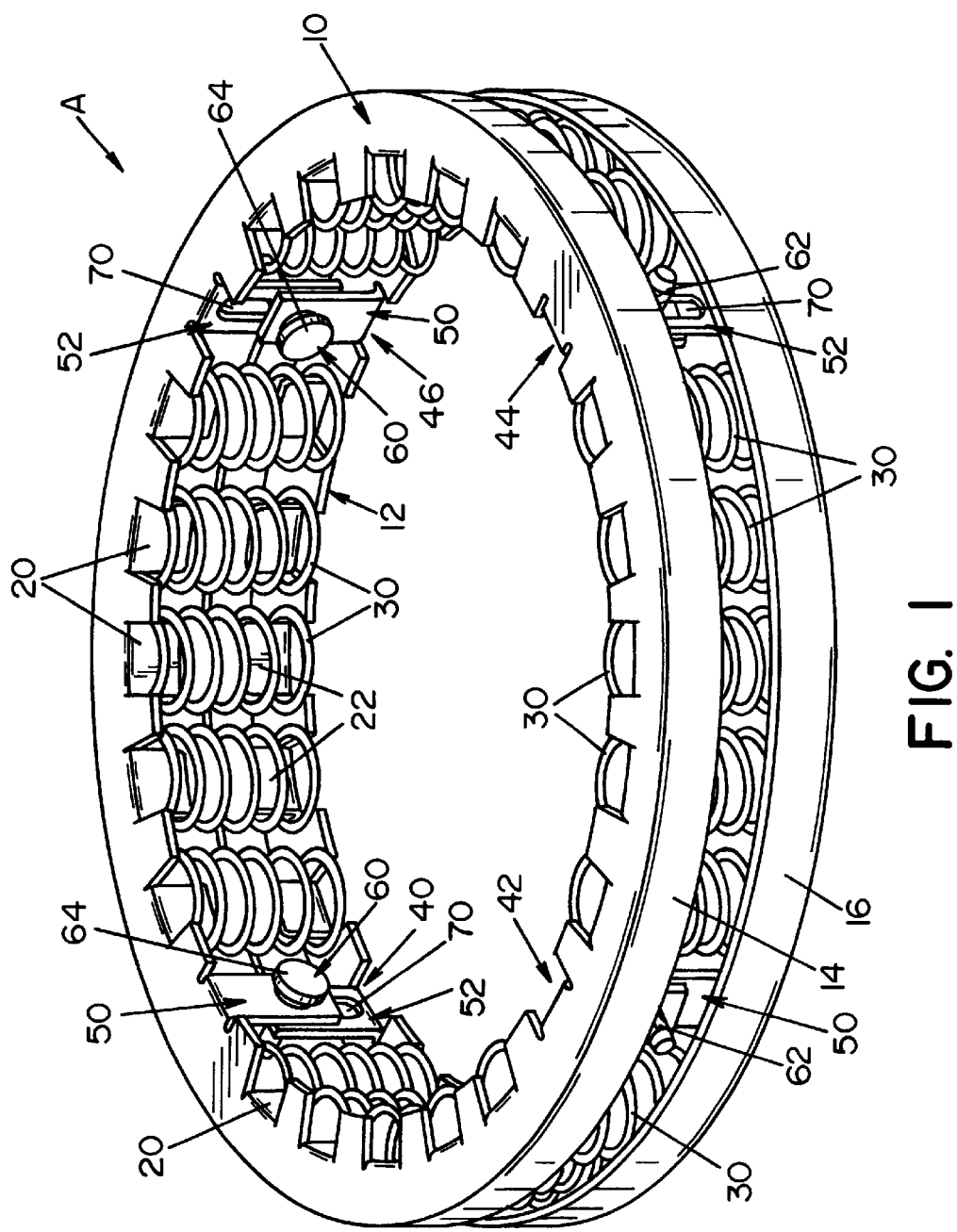
FIG. 1 is a pictorial view of the preferred embodiment of the present invention.
Figure 2:
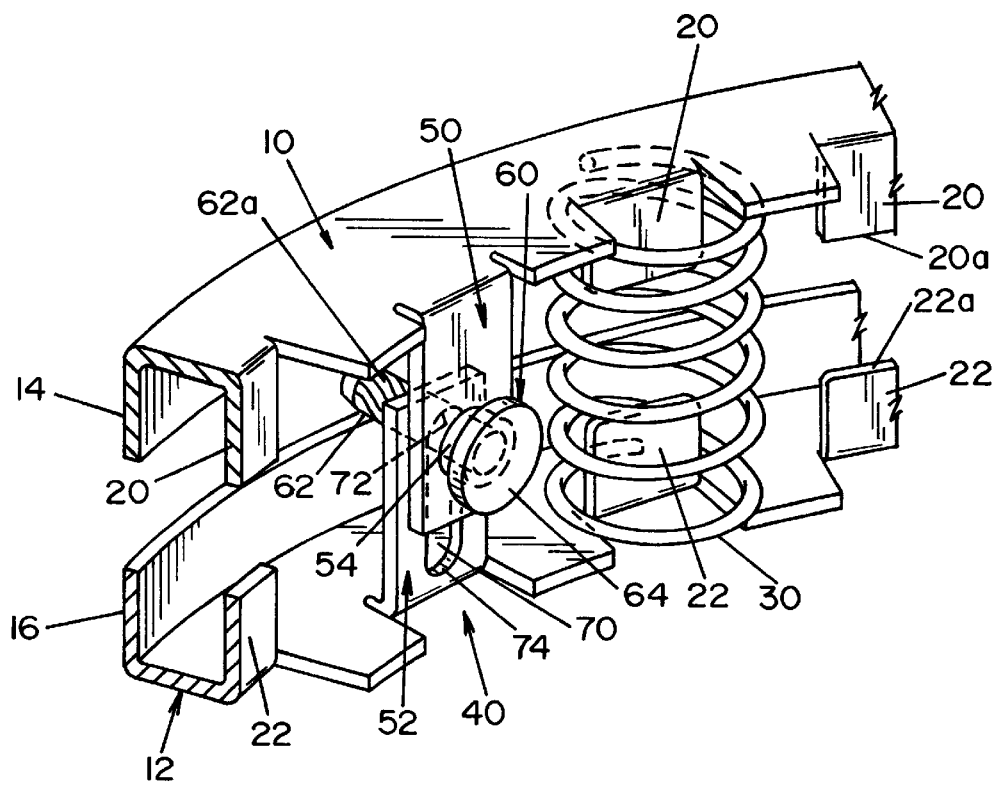
FIG. 2 is an enlarged pictorial partial view of the preferred embodiment of the present invention.
Figure 3:
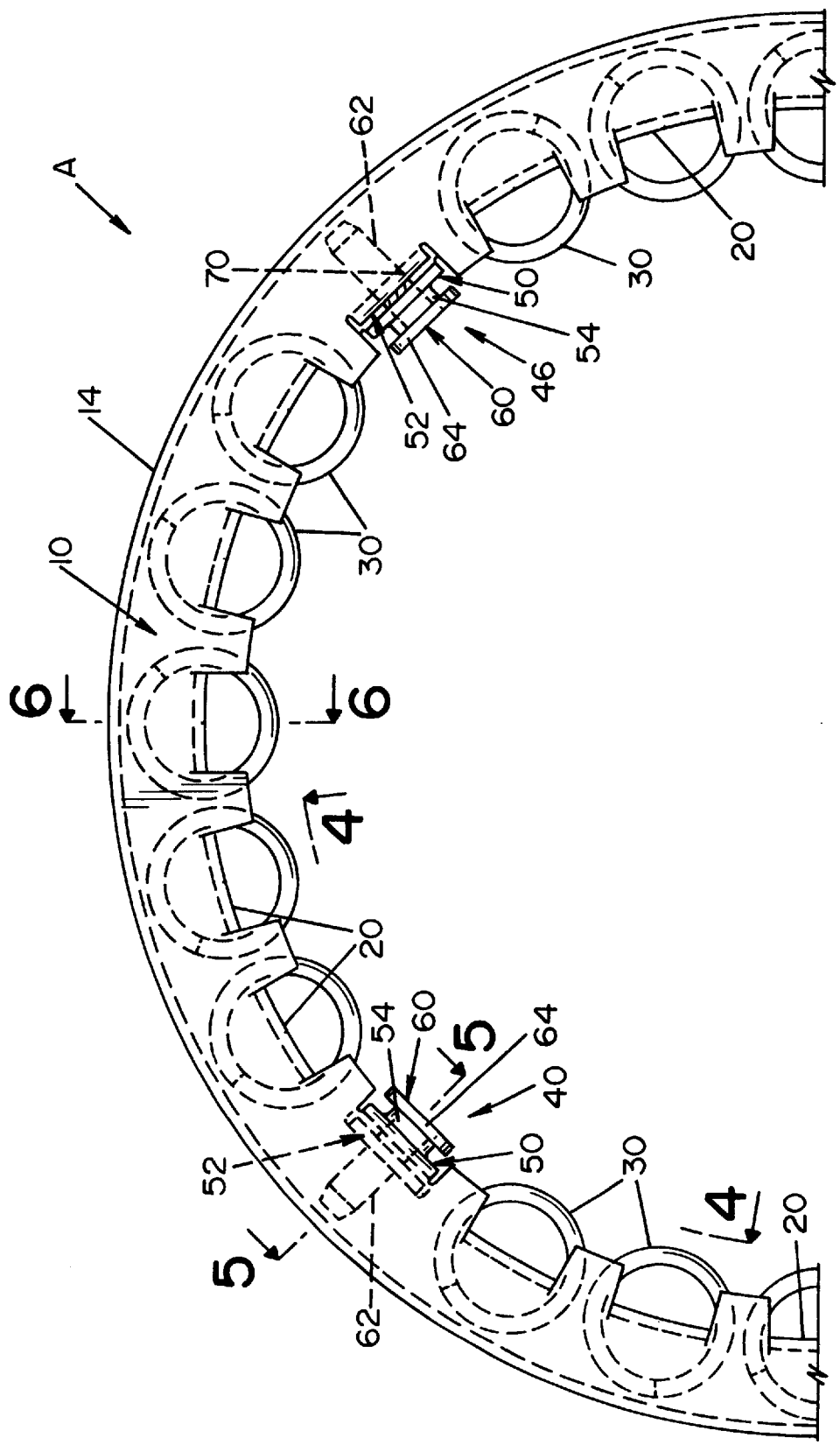
FIG. 3 is a top plan view showing one half of the ring shaped spring device constructed in accordance with the preferred embodiment of the present invention.
Figure 7:
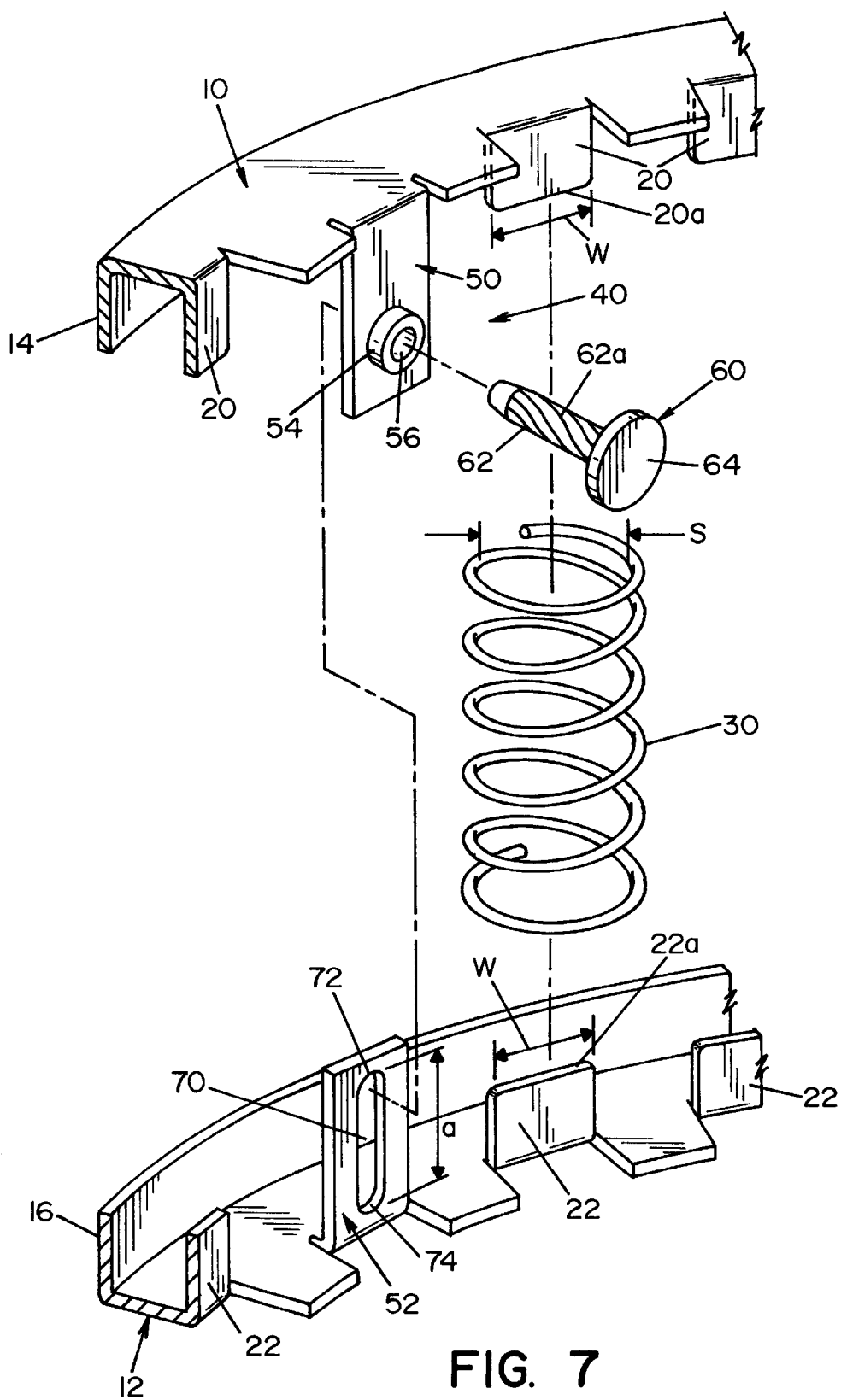
FIG. 7 is an exploded partial view showing the assembly operation used in the preferred embodiment of the present invention.

Referring now to the drawings, wherein the showings are for the purpose of illustrating a preferred embodiment of the invention only and not for the purpose of limiting same, FIG. 1 and FIG. 3 show annular spaced-apart plates 10, 12 with outer rims 14, 16, respectively. Bent edge tabs 20 of plate 10 and tabs 22 of plate 12 are bent downwardly to locate at circumferentially spaced positions a number of coil springs 30. The spring supporting tabs 20, 22 are best shown in FIGS. 2, 4, 6 and 7. They have spaced edges 20a, 22a with a gap therebetween. The height of the integral lanced tabs 20, 22 maintain a gap between edges 20a, 22a. The width W of the spring locating tabs, as shown in FIG. 7, are just slightly larger than the diameters of the center passage of springs 30. Any number of tabs and springs can be circumferentially spaced around plates 10, 12. In the preferred embodiment, twenty springs are employed and located in groups of five. Four guide assemblies 40, 42, 44 and 46 are positioned between the groups of springs. All the guide assemblies are essentially the same, except they are formed in opposite directions at alternate positions. In the preferred embodiment, guide assemblies 40, 44 are oriented in one orientation and guide assemblies 42, 46 are oriented in the opposite direction. Each of the guide assemblies has the same basic structure. It is possible to have all guide assemblies with the same orientation; however, to obtain identical plates 10, 12 for use on opposite sides of device A, the alternate orientation of guide assemblies is used. Thus, in the preferred embodiment, plates 10 and 12 are structurally the same. Plates 10, 12 are positioned facing each other and are rotated 90° to create the assembly guide assemblies 40, 42, 44 and 46. The advantage of this concept using identical plates can be obtained with any even number of equally spaced guide assemblies around the ring shaped by plates 10, 12.

Figure 5:
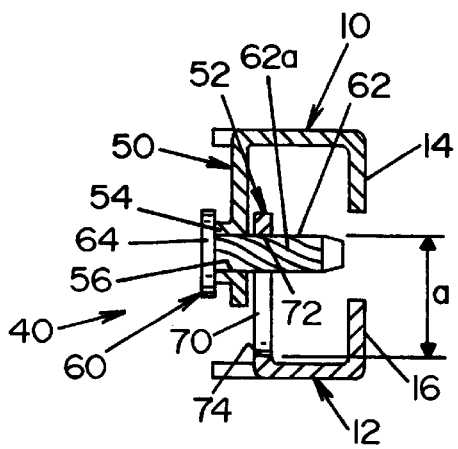
FIG. 5 is a cross-sectional view taken generally along line 5—5 of FIG. 3.
Figure 6:
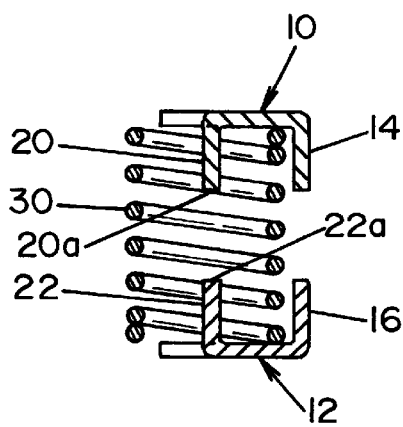
FIG. 6 is a cross-sectional view taken generally along line 6—6 of FIG. 3.

Referring now more specifically to FIGS. 2, 5 and 7, all guide assemblies are the same. Only guide assembly 40 will be described in detail and this description applies to the other guide assemblies. Integral sliding contact tabs 50, 52 are provided on the opposite plates 10, 12. When the plates are assembled with springs 30 in the desired locations, tabs 50, 52 generally slide with respect to each other. Tab 50 includes an extruded boss 54 defining an inner generally cylindrical bore 56. Radially extending guide member in the form of pin 60 has a body portion 62 with an outer roughened surface 62a so the pin can be pressed fitted into bore 56 of tab 50.

Figure 4:
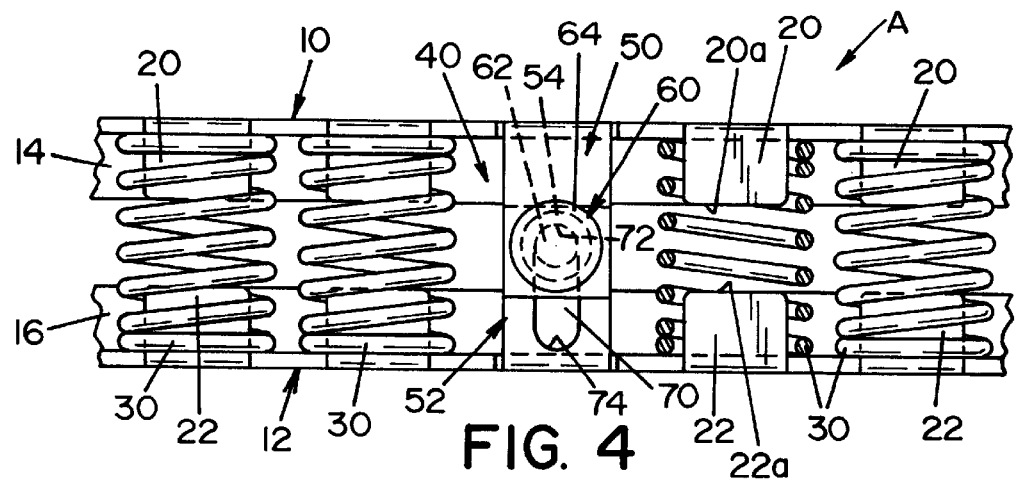
FIG. 4 is an enlarged cross-sectional view taken generally along line 4—4 of FIG. 3 showing a part of the ring-shaped spring assembly with one coil spring in cross section and the assembly pre-pressed for mounting in a transmission.
Figure 4A:
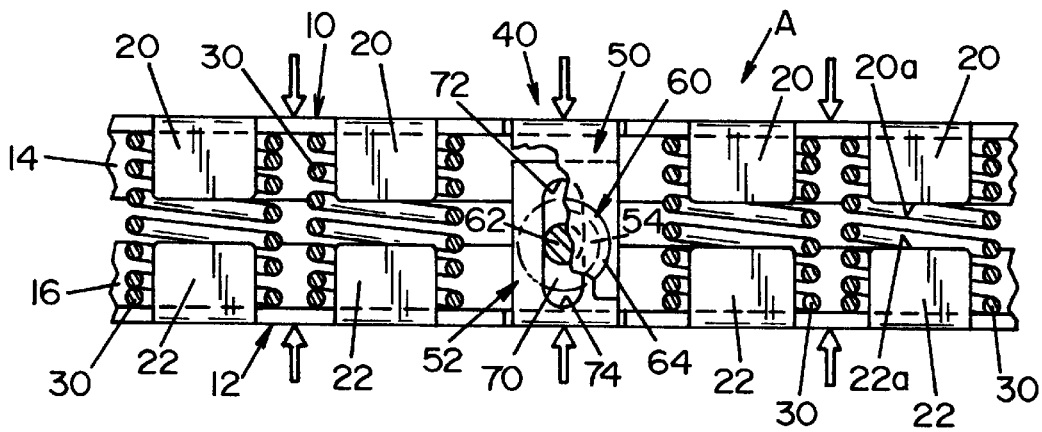
FIG. 4A is a view similar to FIG. 4 showing the spring-device further compressed and with one sliding, movement controlling tab cut away.

Head 64 of pin 60 abuts the outer surface of boss 54 to define the inwardly extended position of pin 60. This pin has a width or diameter generally matching the width of vertical guide slot 70 so pin 60 and slot 70 coact to guide vertical movement of plates 10, 12 as the transmission action compresses device A between the position shown in FIG. 4 and the position shown in FIG. 4A. To define the assembled condition of device A as shown in FIG. 4, slot 70 includes a remote end 72 spaced distance a from plate 12, as shown in FIGS. 5 and 7. The other end or bottom end 74 of slot 70 is at a clearance distance and does not normally contact pin 60 even when plates 10, 12 are compressed as shown in FIG. 4A. After pressing pin 60 into bore 56, as best shown in FIG. 5, body 62 constitutes a guide member coacting with vertical slot 70 to vertically guide the movement of the two plates. Assembly 40 has the slotted tab 52 on plate 12. The alternate assemblies 42, 46 have the slotted tab on plate 10. Otherwise, the guide assemblies are the same. By using the guide assemblies, plates 10, 12 move only in a vertical direction. Even when they are compressed to a substantial extent, as shown in FIG. 4A, control is maintained so there will be no angular movement of one plate with respect to the other. This advantage is obtained, in the preferred embodiment, by the combination of a pin and slot. Of course, other modifications could be made, such as a cylindrical pin on one plate extending into a vertical cylindrical passage on the other plate. In this manner, the sliding action between a member on one plate is controlled to a vertical direction by a member on the second plate. Other modifications could be made to accomplish this same operation.

Having thus defined the invention, the following is claimed:

1. A spring device comprising a pair of spaced-apart first and second annular support plates defining a ring with a central axis; a plurality of circumferentially spaced, parallel oriented coil springs disposed between said annular plates and having associated therewith a free-state height for said coil springs; and, a plurality of guide assemblies located at circumferentially spaced positions around said ring, each of said guide assemblies including a first tab extending from one of said plates toward the other of said plates, a second tab extending from said other of said plates toward said one of said plates to form a generally sliding contact between said first and second tabs as said plates move vertically to compress and/or release said coil springs, said first tab having a guide slot with a given width and extending in a direction perpendicular to said plates and said second tab carrying an assembled elongated guide member extending radially of said ring and through said slot to guide vertical movement between said plates.

2. A spring assembly, as defined in claim 1, wherein said positions of said guide assemblies are between said coil springs.

3. A spring assembly, as defined in claim 2, wherein said tabs are formed integrally of said plate from which they extend.

4. A spring assembly as defined in claim 2 wherein there are a even number of said guide assemblies arranged in alternating groups, one group of said guide assemblies having said first tab extending from said first plate and said second tab extending from said second plate and the other group of guide assemblies having said first tab extending from said second plate and said second tab extending from said first plate.

5. A spring assembly as defined in claim 2 wherein said guide slot has an end remote from said plate from which said second tab extends, said end being spaced from said plate a distance to compress said coil springs by action of said guide member in said slot of said first tab.

6. A spring assembly as defined in claim 2 wherein said guide member has a transverse width generally matching, but slightly less than said given width of said guide slot.

7. A spring assembly as defined in claim 3 wherein said guide member has a transverse width generally matching, but slightly less than said given width of said guide slot.

8. A spring assembly, as defined in claim 1, wherein said tabs are formed integrally of said plate from which they extend.

9. A spring assembly as defined in claim 8 wherein there are a even number of said guide assemblies arranged in alternating groups, one group of said guide assemblies having said first tab extending from said first plate and said second tab extending from said second plate and the other group of guide assemblies having said first tab extending from said second plate and said second tab extending from said first plate.

10. A spring assembly as defined in claim 8 wherein said guide member has a transverse width generally matching, but slightly less than said given width of said guide slot.

11. A spring assembly as defined in claim 8 wherein said guide slot has an end remote from said plate from which said second tab extends, said end being spaced from said plate a distance to compress said coil springs by action of said guide member in said slot of said first tab.

12. A spring assembly as defined in claim 1 wherein said guide member has a transverse width generally matching, but slightly less than said given width of said guide slot.

13. A spring assembly as defined in claim 12 wherein said guide slot has an end remote from said plate from which said second tab extends, said end being spaced from said plate a distance to compress said coil springs by action of said guide member in said slot of said first tab.

14. A spring assembly as defined in claim 12 wherein there are a even number of said guide assemblies arranged in alternating groups, one group of said guide assemblies having said first tab extending from said first plate and said second tab extending from said second plate and the other group of guide assemblies having said first tab extending from said second plate and said second tab extending from said first plate.

15. A spring assembly as defined in claim 1 wherein there are a even number of said guide assemblies arranged in alternating groups, one group of said guide assemblies having said first tab extending from said first plate and said second tab extending from said second plate and the other group of guide assemblies having said first tab extending from said second plate and said second tab extending from said first plate.

16. A spring assembly as defined in claim 1 wherein said guide slot has an end remote from said plate from which said second tab extends, said end being spaced from said plate a distance to compress said coil springs by action of said guide member in said slot of said first tab.

17. A spring assembly as defined in claim 16 wherein there are a even number of said guide assemblies arranged in alternating groups, one group of said guide assemblies having said first tab extending from said first plate and said second tab extending from said second plate and the other group of guide assemblies having said first tab extending from said second plate and said second tab extending from said first plate.

18. A spring device comprising a pair of spaced-apart first and second annular support plates defining a ring with a central axis; a plurality of circumferentially spaced, parallel oriented coil springs disposed between said annular plates and having associated therewith a free-state height for said coil springs; and, a plurality of guide assemblies located at circumferentially spaced positions around said ring, each of said guide assemblies including a first tab extending from one of said plates toward the other of said plates, a second tab extending from said other of said plates toward said one of said plates to form a generally sliding contact between said first and second tabs as said plates move vertically to compress and/or release said coil springs, said first tab having a guide slot with a given width and extending in a direction perpendicular to said plates, said second tab carrying an assembled elongated guide member extending radially of said ring and through said slot to guide vertical movement between said plates, said tabs are formed integrally of said plate from which they extend, and said second tab includes a bore defined by an extruded boss and said guide member being press fitted into said bore.

19. A spring assembly as defined in claim 18 wherein said guide member has a transverse width generally matching, but slightly less than said given width of said guide slot.

20. A spring device comprising a pair of spaced-apart first and second annular support plates defining a ring with a central axis; a plurality of circumferentially spaced, parallel oriented coil springs disposed between said annular plates and having associated therewith a free-state height for said coil springs; and, a plurality of guide assemblies located at circumferentially spaced positions around said ring, each of said guide assemblies including a first tab extending from one of said plates toward the other of said plates, a second tab extending from said other of said plates toward said one of said plates to form a generally sliding contact between said first and second tabs as said plates move vertically to compress and/or release said coil springs, said first tab having a guide slot with a given width and extending in a direction perpendicular to said plates, said second tab carrying an assembled elongated guide member extending radially of said ring and through said slot to guide vertical movement between said plates, said positions of said guide assemblies are between said coil springs, said tabs are formed integrally of said plate from which they extend, and said second tab includes a bore defined by an extruded boss and said guide member being press fitted into said bore.

21. A spring assembly as defined in claim 20 wherein said guide member has a transverse width generally matching, but slightly less than said given width of said guide slot.

22. A spring device comprising a pair of spaced-apart first and second annular support plates defining a ring with a central axis; a plurality of circumferentially spaced, parallel oriented coil springs disposed between said annular plates and having associated therewith a free-state height for said coil springs; and, a plurality of guide assemblies located at circumferentially spaced positions around said ring, each of said guide assemblies including a first tab extending from one of said plates toward the other of said plates, a second tab extending from said other of said plates toward said one of said plates to form a generally sliding contact between said first and second tabs as said plates move vertically to compress and/or release said coil springs, said first tab having a guide slot with a given width and extending in a direction perpendicular to said plates, said second tab carrying an assembled elongated guide member extending radially of said ring and through said slot to guide vertical movement between said plates, said positions of said guide assemblies are between said coil springs, and said second tab includes a bore defined by an extruded boss and said guide member being press fitted into said bore.

23. A spring assembly as defined in claim 22 wherein said guide member has a transverse width generally matching, but slightly less than said given width of said guide slot.

24. A spring device comprising a pair of spaced-apart first and second annular support plates defining a ring with a central axis; a plurality of circumferentially spaced, parallel oriented coil springs disposed between said annular plates and having associated therewith a free-state height for said coil springs; and, a plurality of guide assemblies located at circumferentially spaced positions around said ring, each of said guide assemblies including a first tab extending from one of said plates toward the other of said plates, a second tab extending from said other of said plates toward said one of said plates to form a generally sliding contact between said first and second tabs as said plates move vertically to compress and/or release said coil springs, said first tab having a guide slot with a given width and extending in a direction perpendicular to said plates, said second tab carrying an assembled elongated guide member extending radially of said ring and through said slot to guide vertical movement between said plates, and said second tab includes a bore defined by an extruded boss and said guide member being press fitted into said bore.

25. A spring assembly as defined in claim 24 wherein said guide member has a transverse width generally matching, but slightly less than said given width of said guide slot.

26. A spring assembly as defined in claim 24 wherein said guide slot has an end remote from said plate from which said second tab extends, said end being spaced from said plate a distance to compress said coil springs by action of said guide member in said slot of said first tab.

27. A spring assembly as defined in claim 24 wherein there are a even number of said guide assemblies arranged in alternating groups, one group of said guide assemblies having said first tab extending from said first plate and said second tab extending from said second plate and the other group of guide assemblies having said first tab extending from said second plate and said second tab extending from said first plate.

28. A spring device comprising a pair of spaced-apart first and second annular support plates defining a ring with a central axis; a plurality of circumferentially spaced, parallel oriented coil springs disposed between said annular plates and having associated therewith a free-state height for said coil springs; and, plurality of guide assemblies located at circumferentially spaced positions around said ring, each of said guide assemblies including a first member extending from one of said plates toward the other of said plates, a second member extending from said other of said plates toward said one of said plates wherein said members have sliding surfaces extending in a vertical direction to form a generally vertical sliding movement between said first and second members as said plates move vertically to compress and/or release said coil springs.

\* \* \* \* \*